United States Patent
Yamazaki et al.

(10) Patent No.: US 10,822,032 B2
(45) Date of Patent: Nov. 3, 2020

(54) TURNING MECHANISM AND VEHICLE

(71) Applicant: HONDA MOTOR CO., LTD., Minato-ku, Tokyo (JP)

(72) Inventors: Ryousuke Yamazaki, Wako (JP); Takumi Inagaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 16/253,544

(22) Filed: Jan. 22, 2019

(65) Prior Publication Data

US 2019/0225269 A1   Jul. 25, 2019

(30) Foreign Application Priority Data

Jan. 24, 2018   (JP) .................... 2018-009583

(51) Int. Cl.
  B62D 17/00   (2006.01)
  B62D 7/14   (2006.01)
  (Continued)

(52) U.S. Cl.
  CPC ......... B62D 17/00 (2013.01); B60G 17/0195 (2013.01); B62D 5/0418 (2013.01);
  (Continued)

(58) Field of Classification Search
  CPC ........ B62D 7/146; B62D 17/00; B62D 7/148; B62D 5/0418; B60G 17/0195;
  (Continued)

(56) References Cited

U.S. PATENT DOCUMENTS 4,953,649 A * 9/1990 Kawai .................... B62D 7/148
                                                    180/404
5,014,801 A * 5/1991 Hirose .................... B62D 7/148
                                                    180/412
(Continued)

FOREIGN PATENT DOCUMENTS

JP      05-085390 A     4/1993
JP      H06-000505 B2   1/1994
(Continued)

OTHER PUBLICATIONS

Office Action dated Aug. 27, 2019 issued over the corresponding Japanese Patent Application No. 2018-009583 with the English translation thereof.

*Primary Examiner* — Toan C To
(74) *Attorney, Agent, or Firm* — Carrier Blackman & Associates, P.C.; Joseph P. Carrier; William D. Blackman

(57) ABSTRACT

A turning mechanism is equipped with a wire (first movable member) which moves in a movable direction (direction of the arrow B) under the motive power of a turning actuator, a wire (second movable member) which moves in a movable direction under the motive power of a turning actuator, and a coupler connecting the two wires. The coupler is configured in a manner so that the wires are capable of being moved independently in the case that a difference (differential angle) between the toe angles of the rear wheels lies within an allowable range, whereas in the case that the differential angle has exceeded the allowable range, is configured in a manner so that the wires are capable of being operated in a mutually interlocked manner.

3 Claims, 13 Drawing Sheets

(51) Int. Cl.
  *B60G 17/0195*  (2006.01)
  *B62D 5/04*  (2006.01)
(52) U.S. Cl.
  CPC ............. *B62D 7/146* (2013.01); *B62D 7/148* (2013.01); *B60G 2200/44* (2013.01); *B60G 2200/4622* (2013.01); *B60G 2206/1114* (2013.01)
(58) Field of Classification Search
  CPC ........ B60G 2206/1114; B60G 2200/44; B60G 2200/4622
  USPC ..................... 280/5.51, 5.52, 5.522, 5.524
  See application file for complete search history.

(56) References Cited

U.S. PATENT DOCUMENTS

| | | | | |
|---|---|---|---|---|
| 5,143,400 A | * | 9/1992 | Miller | ................... B62D 17/00 180/413 |
| 9,994,199 B2 | * | 6/2018 | Baehrle-Miller | ..... B60T 13/741 |
| 2008/0162009 A1 | * | 7/2008 | Miki | ................... B60G 17/0164 701/80 |
| 2008/0201037 A1 | * | 8/2008 | Suyama | ................ B60W 40/10 701/36 |
| 2012/0059552 A1 | * | 3/2012 | Mori | ..................... B62D 17/00 701/49 |
| 2013/0345934 A1 | * | 12/2013 | Sekiya | ................... B62D 7/148 701/41 |
| 2015/0069730 A1 | | 3/2015 | Kawauchi et al. | |
| 2016/0023679 A1 | * | 1/2016 | Matsuoka | ................ B62D 9/00 74/471 R |
| 2016/0362133 A1 | * | 12/2016 | Auden | ................... B62D 17/00 |
| 2018/0251123 A1 | * | 9/2018 | Sigmar | ................ B60W 20/00 |

FOREIGN PATENT DOCUMENTS

| | | |
|---|---|---|
| JP | 2009-101858 A | 5/2009 |
| JP | 2015-054536 A | 3/2015 |

* cited by examiner

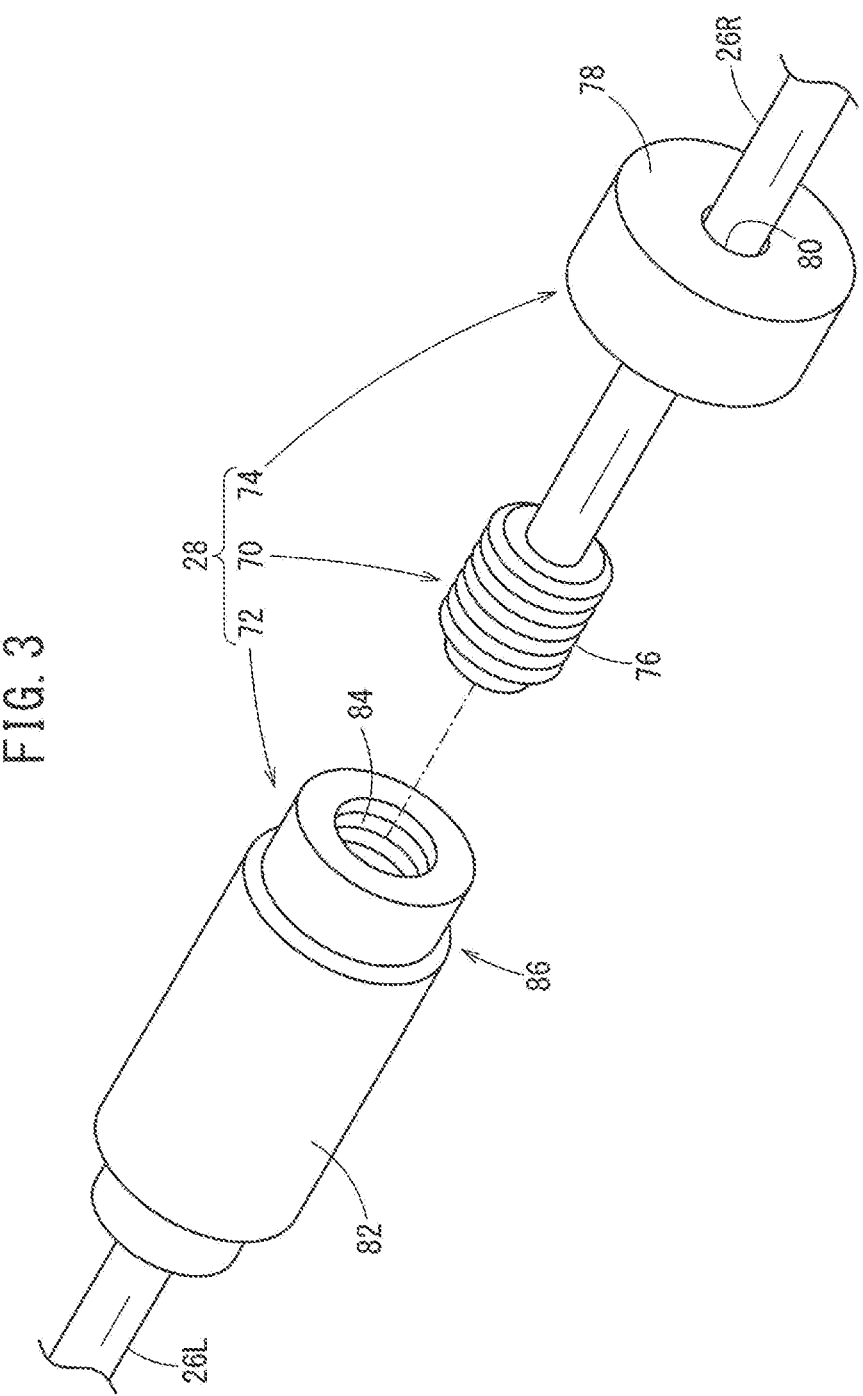

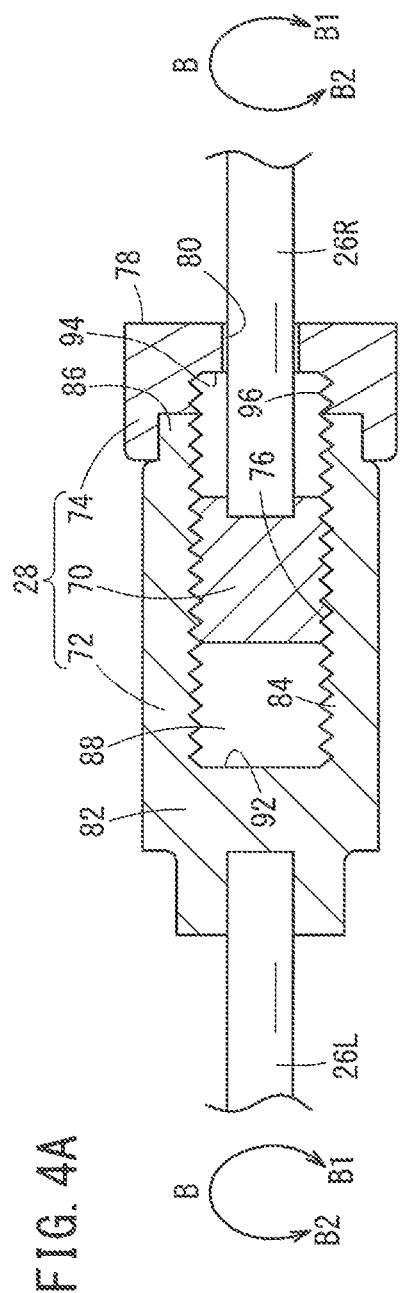
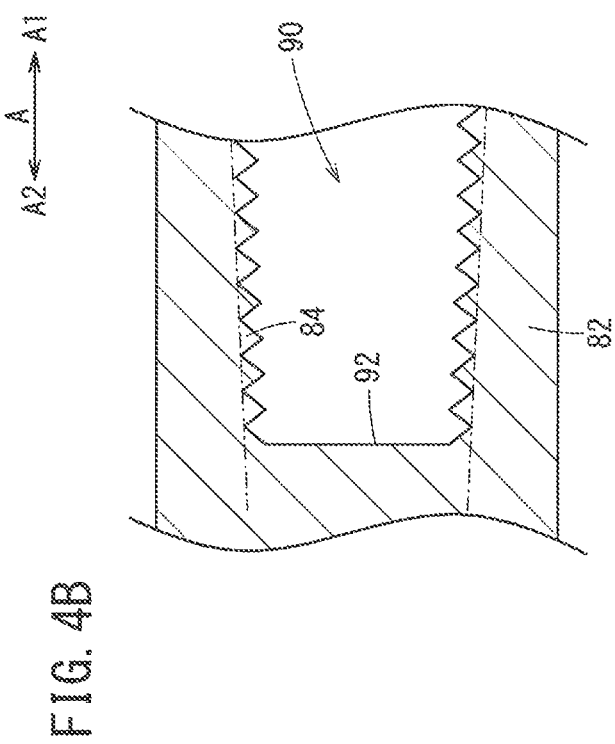
FIG. 4A
FIG. 4B

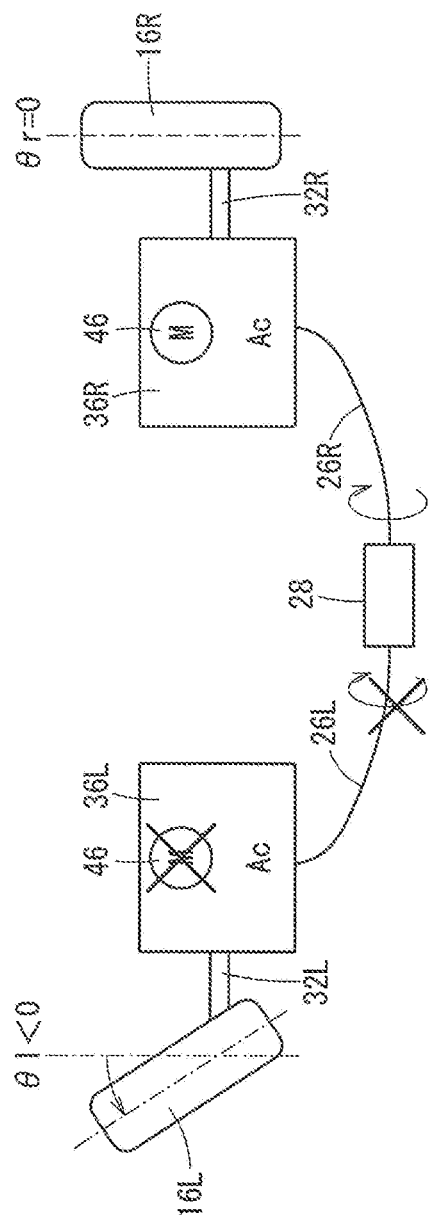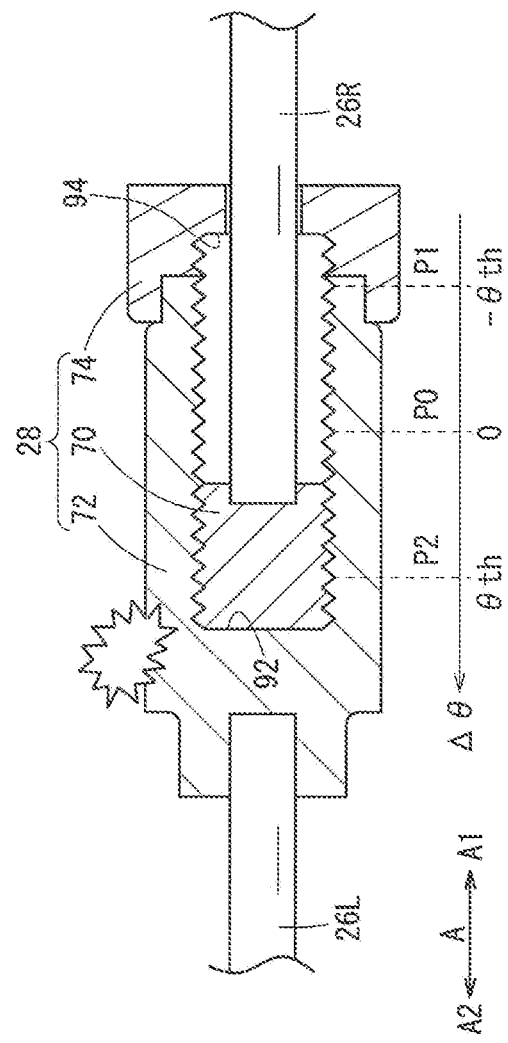
FIG. 7A
FIG. 7B

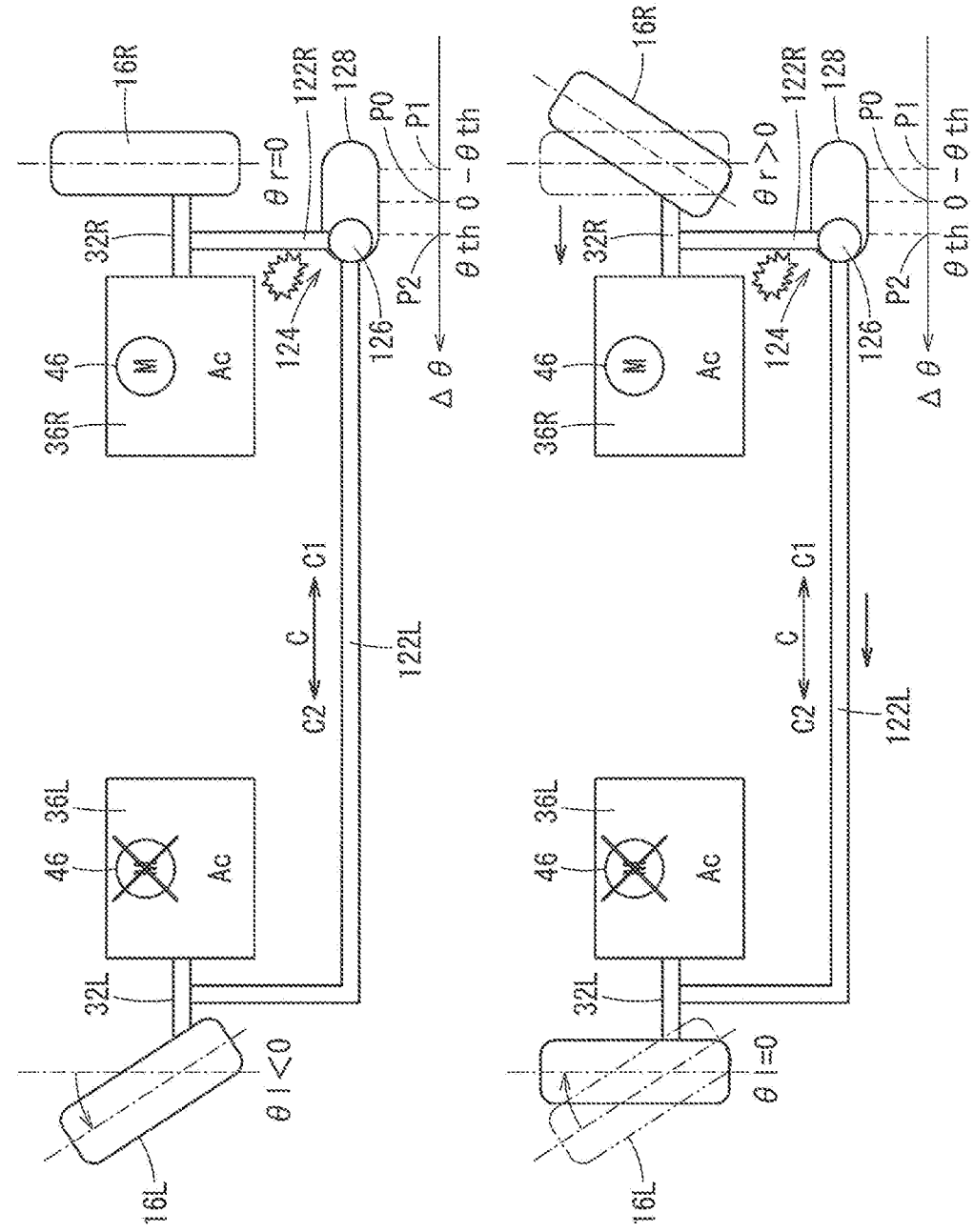

TURNING MECHANISM AND VEHICLE

CROSS-REFERENCE TO RELATED APPLICATION

This application is based upon and claims the benefit of priority from Japanese Patent Application No. 2018-009583 filed on Jan. 24, 2018, the contents of which are incorporated herein by reference.

BACKGROUND OF THE INVENTION

Field of the Invention

The present invention relates to a turning mechanism including turning actuators for adjusting the toe angles of vehicle wheels, as well as to a vehicle equipped with such a turning mechanism.

Description of the Related Art

Conventionally, a turning mechanism has been known, which is configured to include turning actuators for adjusting the toe angles of vehicle wheels possessed by a vehicle. For example, various mechanical structures have been proposed for smoothly returning the toe angles to a neutral state at a predetermined timing.

In Japanese Patent Publication No. 06-000505 (see FIG. 1), a steering apparatus is proposed in which, when steering is ended, a neutral restoring means is used to urge a rack shaft that applies a steering assist force toward a neutral position. More specifically, a disclosure is made to the effect that such a neutral restoring means is constituted from two compression springs which are placed in abutment from both sides of a ball nut that is capable of moving integrally with the rack shaft.

SUMMARY OF THE INVENTION

However, with the steering apparatus proposed in Japanese Examined Patent Publication No. 06-000505 (see FIG. 1), regardless of the positioning of the rack shaft, the ball nut always receives a resilient force from at least one of the compression springs. Therefore, when adjusting the toe angle, at all times, the ball nut must inevitably be moved in opposition to the resilient force of the compression springs. As a result, for example, at a time of high speed traveling where higher responsiveness is required, in the vicinity of a neutral state, the steering responsiveness decreases.

Further, in a turning mechanism which is capable of turning the left and right vehicle wheels independently, as a result of the failure of one of the turning actuators, it can be expected that the toe angle will be returned to the neutral state only for one of the vehicle wheels that is connected to the one of the turning actuators. However, in the case that operations of the other turning actuator are continued without modification, upon significantly turning the other vehicle wheel, there is a possibility that the difference between the left and right toe angles may become large, and the traveling behavior of the vehicle may become unstable.

The present invention has been devised taking into consideration the aforementioned problems, and has the object of providing a turning mechanism and a vehicle equipped with such a turning mechanism, which is capable of maintaining the stability of the traveling behavior of a vehicle even in a situation in which one of the turning actuators has failed, and without lowering steering responsiveness during normal traveling.

A turning mechanism according to a first aspect of the present invention comprises a first turning actuator adapted to adjust a toe angle of a first vehicle wheel, a first movable member adapted to move in a movable direction under a motive power of the first turning actuator, a second turning actuator adapted to adjust a toe angle of a second vehicle wheel, a second movable member adapted to move in a movable direction under a motive power of the second turning actuator, and a coupler connecting the first movable member and the second movable member, wherein the coupler is configured in a manner so that the first movable member and the second movable member are capable of being moved independently in the case that a difference between the toe angles of the first vehicle wheel and the second vehicle wheel lies within an allowable range, whereas, in the case that the difference between the toe angles has exceeded the allowable range, is configured in a manner so that the first movable member and the second movable member are capable of being operated in a mutually interlocked manner.

In the foregoing manner, in the case that the difference between the toe angles lies within the allowable range, the coupler is configured to be capable of independently moving the first movable member and the second movable member, and therefore, at a time of normal traveling, a decrease in steering responsiveness is not caused due to the mechanical structure.

On the other hand, in the case that the difference between the toe angles has exceeded the allowable range, the coupler is configured so as to be capable of operating the first movable member and the second movable member in a mutually interlocked manner, whereby even in the case that the motive power from one of the turning actuators is stopped, the motive power from the other of the turning actuators is capable of being transmitted. Thereafter, the toe angles of the two vehicle wheels are synchronously adjusted by the other of the turning actuators, and therefore, it is possible to avoid a situation in which the difference between the toe angles further increases.

Consequently, without lowering steering responsiveness during normal traveling, it is possible to maintain the stability of the traveling behavior of the vehicle even in a situation in which one of the turning actuators has failed. As a result, the traveling performance is improved in accordance with a toe-in control, which utilizes the advantage of a turning mechanism that is capable of turning the right and left vehicle wheels independently.

Further, each of the first turning actuator and the second turning actuator may be an actuator adapted to convert rotational motion of a motor into linear motion, and each of the first movable member and the second movable member may be a wire adapted to be rotated in a circumferential direction by rotational power from the motor. By transmitting rotational power through the two wires, the mutual influence of one on the other when a turning control is performed is reduced, in comparison with a configuration in which linear power is directly transmitted to the vehicle wheels.

Further, the coupler may comprise a first screw-engagement member attached to a distal end portion of the first movable member, and having a first threaded portion, and a second screw-engagement member attached to a distal end portion of the second movable member, and having a second threaded portion capable of being screw-engaged with the first threaded portion, wherein the first screw-engagement member and the second screw-engagement member may be fixed to each other in the case that the difference between the toe angles has exceeded the allowable range. In accordance with these features, while providing a simplified device configuration, the function of synchronously adjusting the toe angles of the two vehicle wheels can be realized.

A vehicle according to a second aspect of the present invention is equipped with any of the above-described turning mechanisms. Consequently, without lowering steering responsiveness during normal traveling, it is possible to maintain the stability of the traveling behavior of the vehicle even in a situation in which one of the turning actuators has failed.

In accordance with the turning mechanism and the vehicle according to the present invention, without lowering steering responsiveness during normal traveling, it is possible to maintain the stability of the traveling behavior of the vehicle even in a situation in which one of the turning actuators has failed.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is an exploded perspective view of a coupler shown in FIG. 1;

FIG. 4A is a longitudinal cross-sectional view of the coupler shown in FIG. 1;

FIG. 4B is an enlarged view of a portion of FIG. 4A;

FIG. 7A and FIG. 7B are diagrams showing a state up until a point at which the coupler is operated, after the motive power (torque) of the motor on the left side has been stopped;

FIG. 13A and FIG. 13B are diagrams showing a state up until a point at which the coupler is operated, and a state in which the coupler is operating after the motive power (torque) of the motor on the left side has been stopped.

DESCRIPTION OF THE PREFERRED EMBODIMENTS

Preferred embodiments of a turning mechanism according to the present invention will be presented and described below with reference to the accompanying drawings.

First Embodiment

Initially, a vehicle 10 and a turning mechanism 20 according to a first embodiment will be described with reference to FIGS. 1 to 9B.

<Principal Components of Vehicle 10>

Figure 1:
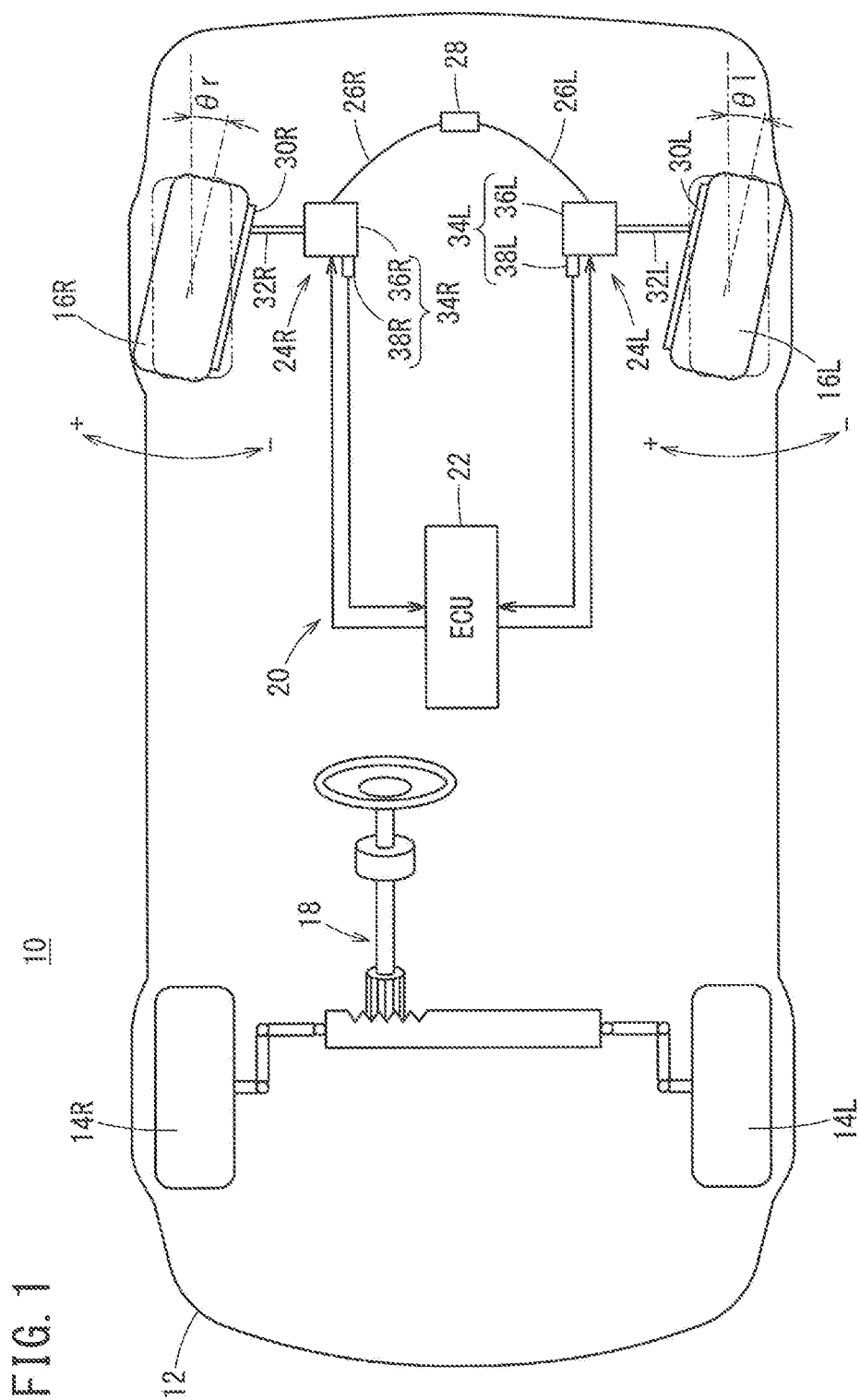
FIG. 1 is a diagram showing principal components of a vehicle in which a turning mechanism according to a first embodiment is incorporated.

FIG. 1 is a diagram showing principal components of a vehicle 10 in which a turning mechanism 20 according to a first embodiment is incorporated. The vehicle 10 is a four-wheeled vehicle having a so-called four-wheel steering (4 WS; 4 Wheel Steering) mechanism. In the descriptions given below, the subscripts "R" and "L" may be omitted in the event there is no need to distinguish between right and left.

The vehicle 10 is constituted to include a vehicle body 12, a pair of front wheels 14R, 14L serving as drive wheels, a pair of rear wheels 16R, 16L serving as driven wheels, a steering mechanism 18 for steering the front wheels 14R, 14L, a turning mechanism 20 for turning the rear wheels 16R, 16L, and an electronic control unit (hereinafter referred to as an ECU) 22 which administers a drive control of the turning mechanism 20.

The turning mechanism 20 is equipped with a rear suspension 24R on which a rear wheel 16R (first vehicle wheel) is suspended on the vehicle body 12, a wire 26R (first movable member) connected to the rear suspension 24R, a rear suspension 24L on which a rear wheel 16L (second vehicle wheel) is suspended on the vehicle body 12, a wire 26L (second movable member) connected to the rear suspension 24L, and a coupler 28 connecting the two wires 26R, 26L.

The right side rear suspension 24R comprises a knuckle 30R that rotatably supports the rear wheel 16R, an arm portion 32R that connects the knuckle 30R to the vehicle body 12, and a toe angle adjustment mechanism 34R connected to the arm portion 32R. The toe angle adjustment mechanism 34R is constituted from a turning actuator 36R (first turning actuator) that causes the arm portion 32R to move in a vehicle widthwise direction, and a toe angle sensor 38R that outputs a detection signal indicative of the toe angle (hereinafter referred to as a right toe angle θr) of the rear wheel 16R.

The left side rear suspension 24L comprises a knuckle 30L that rotatably supports the rear wheel 16L, an arm portion 32L that connects the knuckle 30L to the vehicle body 12, and a toe angle adjustment mechanism 34L connected to the arm portion 32L. The toe angle adjustment mechanism 34L is constituted from a turning actuator 36L (second turning actuator) that causes the arm portion 32L to move in the vehicle widthwise direction, and a toe angle sensor 38L that outputs a detection signal indicative of the toe angle (hereinafter referred to as a left toe angle θl) of the rear wheel 16L.

In this instance, in relation to definitions for the toe angle and the turning direction, a clockwise direction is defined as a positive direction, and a counterclockwise direction is defined as a negative direction, with reference to a neutral (toe zero) state. More specifically, with a right toe angle θr, a toe-out side is in the positive direction, and a toe-in side is in the negative direction. On the other hand, with a left toe angle θl, a toe-in side is in the positive direction, and a toe-out side is in the negative direction. Hereinafter, a difference between the toe angles (hereinafter referred to as a differential angle) is expressed by Δθ=θr−θl.

<Configuration of Turning Actuator 36R (36L)>

Figure 2:
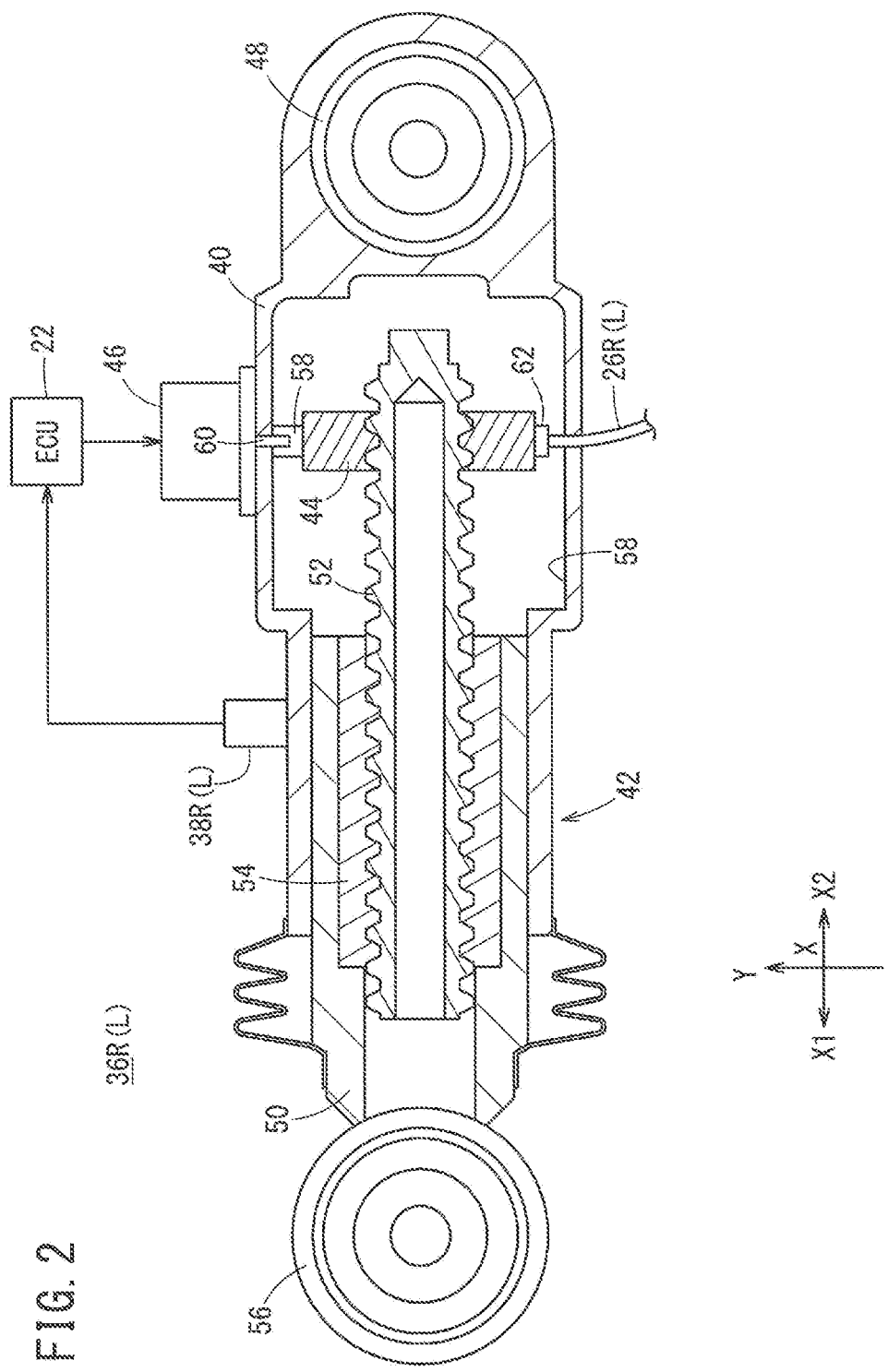
FIG. 2 is an enlarged cross-sectional view of a turning actuator shown in FIG. 1.

FIG. 2 is an enlarged cross-sectional view of the turning actuators 36R and 36L shown in FIG. 1. The turning actuator 36R (36L) is equipped with a vertically elongate case main body 40, a feed screw mechanism 42 and a speed-reducing mechanism 44 accommodated within the case main body 40, and a motor 46 attached to an outer side of the case main body 40.

Hereinafter, in relation to FIG. 2, the longer direction of the case main body 40 (the displacement direction of the turning actuators 36R, 36L) is indicated by an arrow X, and the shorter direction of the case main body 40 (the axial direction of the speed-reducing mechanism 44) is indicated by an arrow Y, respectively. Further, the side toward which the turning actuators 36R, 36L are extended is referred to as an arrow X1 side, and the side toward which the turning actuators 36R, 36L are contracted is referred to as an arrow X2 side.

The arrow X2 side of the case main body 40 is connected to a non-illustrated cross member via a metallic ball joint 48. Instead of the ball joint 48, a rubber bush may be used. The toe angle sensor 38R (38L) is attached to an outer side (at a position of the feed screw mechanism 42) of the case main body 40. The toe angle sensor 38R (38L), for example, is a stroke sensor, which outputs a signal corresponding to an amount of displacement (stroke amount) of the turning actuator 36R (36L).

The feed screw mechanism 42 is equipped with a rod member 50, which extends in the longitudinal direction (displacement direction X) of the case main body 40 and is formed in a cylindrical shape, a ball screw member 52 disposed inside the rod member 50, and a nut member 54 enmeshed with the ball screw member 52.

The rod member 50 is accommodated in the case main body 40, in a state in which a distal end thereof protrudes from the case main body 40. The arrow X1 side of the rod member 50 is connected via a metallic ball joint 56 to the arm portion 32R (32L) shown in FIG. 1. Instead of the ball joint 56, a rubber bush may be used.

The speed-reducing mechanism 44 is constituted, for example, by a worm, and is disposed in an enmeshed manner with the ball screw member 52 of the feed screw mechanism 42. Further, a shaft of the motor 46 (hereinafter referred to as a motor shaft 60) is connected to one end part 58 of the speed-reducing mechanism 44, and the wire 26R (26L) is connected to another end part 62 of the speed-reducing mechanism 44.

<Basic Operations of Turning Mechanism 20>

The turning mechanism 20 according to the present embodiment is configured in the manner described above. Next, basic operations of the turning mechanism 20 will be described while referring to FIGS. 1 and 2.

As shown in FIG. 2, when the motor 46 is rotated in a positive direction, the motive power of the motor 46 is amplified by the speed-reducing mechanism 44 that is connected to the motor shaft 60. The motive power is transmitted to the ball screw member 52, whereby the ball screw member 52 rotates. In addition, accompanying the rotation of the ball screw member 52, the nut member 54 which is enmeshed with the ball screw member 52 moves integrally with the rod member 50 in the direction of the arrow X1.

As shown in FIG. 1, the rear wheel 16R is connected to the rod member 50 (see FIG. 2) via the ball joint 56 (see FIG. 2), the arm portion 32R, and the knuckle 30R. Stated otherwise, the rear wheel 16R is pressed out in conjunction with the rod member 50 toward the side of the arrow X1 (toward the outer side in the vehicle widthwise direction). Consequently, the right toe angle θr is turned by a desired angle in a negative direction, that is, toward the toe-in side.

On the other hand, when the motor 46 is rotated in a negative direction, the motive power of the motor 46 is amplified by the speed-reducing mechanism 44 that is connected to the motor shaft 60. The motive power is transmitted to the ball screw member 52, whereby the ball screw member 52 rotates. In addition, accompanying the rotation of the ball screw member 52, the nut member 54 which is enmeshed with the ball screw member 52 moves integrally with the rod member 50 in the direction of the arrow X2. Upon doing so, the rear wheel 16R is pulled inward in conjunction with the rod member 50 toward the side of the arrow X2 (toward the inner side in the vehicle widthwise direction). Consequently, the right toe angle θr is turned by a desired angle in a positive direction, that is, toward the toe-out side.

Further, in relation to the rear wheel 16L as well, the rear wheel 16L is turned in accordance with the same operations as those in the case of the rear wheel 16R. As a result, when the motor 46 rotates in the positive direction, the left toe angle θl is turned by a desired angle in the positive direction, that is, toward the toe-in side. Conversely, when the motor 46 rotates in the negative direction, the left toe angle θl is turned by a desired angle in the negative direction, that is, toward the toe-out side.

<Specific Configuration of Coupler 28>

FIG. 3 is an exploded perspective view of the coupler 28 shown in FIG. 1. FIG. 4A is a longitudinal cross-sectional view of the coupler 28 shown in FIG. 1. FIG. 4B is an enlarged view of a portion of FIG. 4A. Hereinafter, the longitudinal direction of the coupler 28 (the displacement direction of a first screw-engagement member 70) is indicated by the arrow A. Further, a side in proximity to the wire 26R will be referred to as an arrow A1 side, and a side in proximity to the wire 26L will be referred to as an arrow A2 side.

The coupler 28 is made up from a first screw-engagement member 70 attached to a distal end portion of the wire 26R, a second screw-engagement member 72 attached to a distal end portion of the wire 26L, and a lid member 74 disposed more on a proximal end side of the wire 26R than the second screw-engagement member 72.

The cylindrical first screw-engagement member 70 includes a first threaded portion 76 formed on a side surface thereof. An insertion hole 80 through which the wire 26R is inserted is formed on a lid surface part 78 of the lid member 74.

The second screw-engagement member 72 which has a bottomed cylindrical shape is configured to be capable of accommodating the first screw-engagement member 70 while facilitating screw-engagement therewith. More specifically, the second screw-engagement member 72 includes a tubular portion 82, a second threaded portion 84 on the inner circumferential surface of the tubular portion 82 that can be screwed-engaged with the first threaded portion 76, and a stepped portion 86 provided on the side of an opening of the tubular portion 82.

As shown in FIGS. 4A and 4B, by fitting the lid member 74 onto the stepped portion 86 of the second screw-engagement member 72, a space 88 is formed which is surrounded by the first screw-engagement member 70 and the lid member 74. The second threaded portion 84 is formed in a tapered shape which gradually decreases in diameter toward an inner bottom surface 92 of the tubular portion 82 at a terminal end 90 of the space 88.

Further, at a position surrounding an inner bottom surface 94 of the lid surface part 78, the lid member 74 includes a third threaded portion 96 that can be screwed-engaged with the first threaded portion 76. Similar to the second threaded portion 84, the third threaded portion 96 is formed in a tapered shape which gradually decreases in diameter toward the inner bottom surface 94.

Incidentally, each of the wires 26R, 26L is capable of being rotated in the directions of the arrow B (movable direction) under the motive power of the motor 46 (see FIG. 2). The wire 26R rotates in the direction of the arrow B1 when the rear wheel 16R is steered in the positive direction (toward the toe-out side), and rotates in the direction of the arrow B2 when the rear wheel 16R is steered in the negative direction (toward the toe-in side). On the other hand, the wire 26L rotates in the direction of the arrow B1 when the rear wheel 16L is steered in the positive direction (toward the toe-in side), and rotates in the direction of the arrow B2 when the rear wheel 16L is steered in the negative direction (toward the toe-out side).

<Operations of Coupler 28 (when Operating Normally)>

Figure 5A:
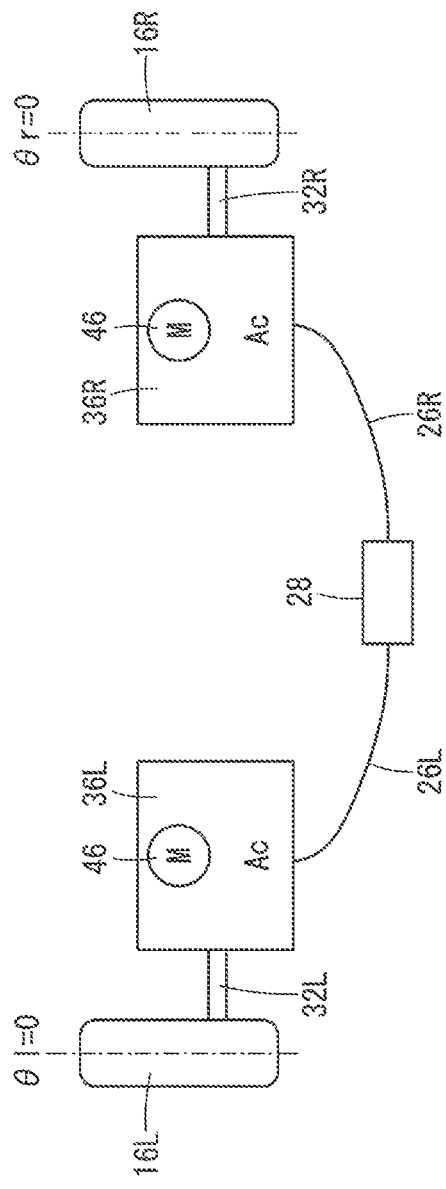
FIG. 5A and FIG. 5B are diagrams showing the state of the coupler at a time of normal straight traveling when both of left and right motors are not being operated.

FIGS. 5A to 6B are views showing the state of the coupler 28 in a case where the motive power of both the left and right motors 46 is transmitted. More specifically, FIG. 5A is a diagram schematically showing a turning state by the turning mechanism 20 shown in FIG. 1. Further, FIG. 5B is a longitudinal cross-sectional view of the coupler 28 in the turning state shown in FIG. 5A. Hereinafter, the same descriptions apply to FIGS. 6A to 9B.

Figure 5B:
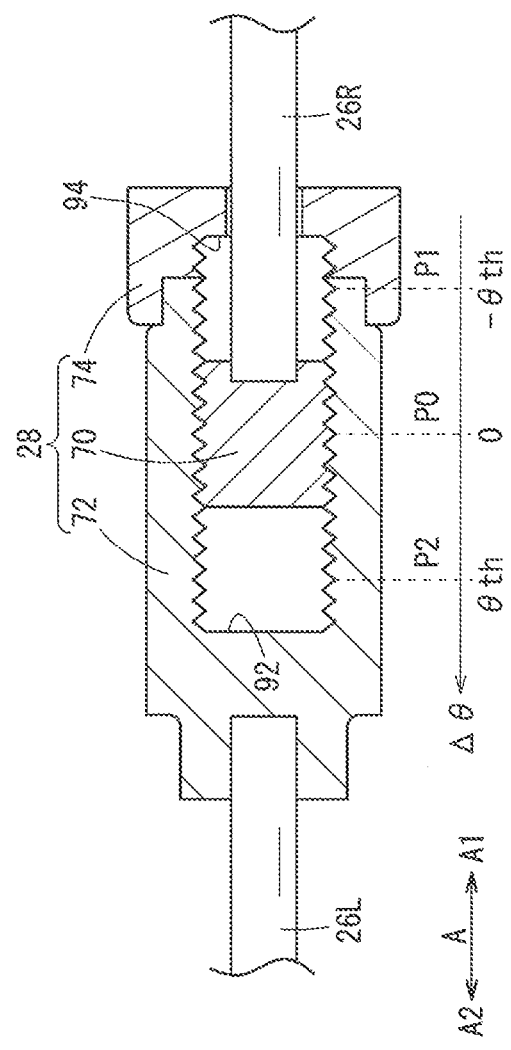

In the example of FIGS. 5A and 5B, a turning state satisfying the relationship of $\theta r=\theta 1=0$, i.e., a state when the vehicle 10 is traveling straight, is shown. In this case, since a condition in which the differential angle $\Delta\theta=0$ is satisfied, the first screw-engagement member 70 remains at the initial position P0.

Figure 6A:
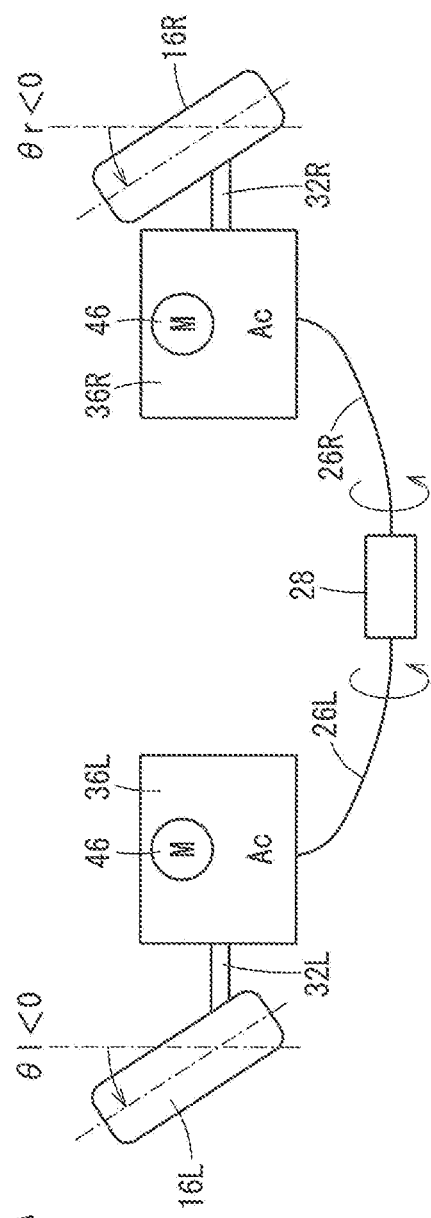
FIG. 6A and FIG. 6B are diagrams showing the state of the coupler at a time of a normal turning operation when both of the left and right motors are operated.
Figure 6B:
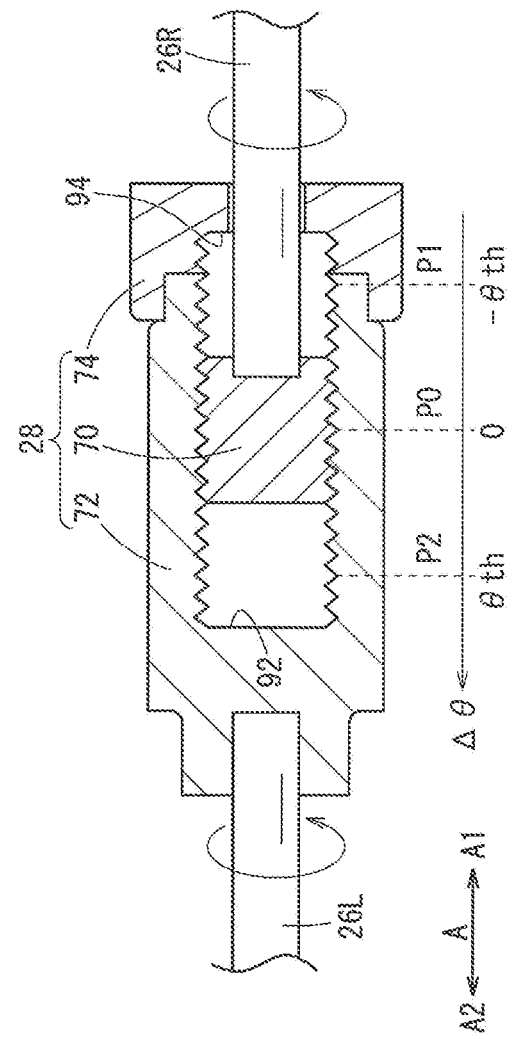

In the example of FIGS. 6A and 6B, a turning state is shown satisfying the relationship of $\theta r=\theta 1<0$. For example, in the case that the toe angles of the rear wheels 16R, 16L are synchronously controlled, the motive powers of the turning actuators 36R, 36L are transmitted to the coupler 28 respectively via the wires 26R, 26L.

During execution of such a synchronous control, the condition in which the differential angle $\Delta\theta=0$ is always satisfied, irrespective of the magnitude of the toe angle. In this case, since the wires 26R, 26L are rotated synchronously in the direction of the arrow B (see FIG. 4A), and the first screw-engagement member 70 and the second screw-engagement member 72 do not move relative to each other, the first screw-engagement member 70 remains stationary at the initial position P0.

In this manner, in the case that the turning actuators 36R, 36L (both the left and right motors 46) are operating normally, the ECU 22 performs the turning control so as to satisfy the relationship of $|\Delta\theta|<\theta th$. Stated otherwise, in the case that the first screw-engagement member 70 lies between a limit position P1 ($\Delta\theta=-\theta th$) and a limit position P2 ($\Delta\theta=\theta th$), the wires 26R and 26L can be moved independently. According to the present example shown in the figure, the initial position P0 is the midpoint between the limit positions P1 and P2, however, the positional relationship is not limited to this feature.

With the coupler 28 in this state, the rotational power by the one wire 26R does not impart any influence to the other turning actuator 36L, and the rotational power by the other wire 26L does not impart any influence to the one turning actuator 36R. Consequently, when the vehicle 10 is traveling normally, a decrease in steering responsiveness is not caused due to the mechanical structure.

<Operations of Coupler 28 (During Failure)>

Incidentally, a state is assumed in which the turning actuator 36L on the left side has suffered from a failure for some reason, and the motive power of the motor 46 has been stopped. Next, operations of the coupler 28 under such a condition will be described while referring to FIGS. 7A to 8B.

FIGS. 7A to 8B are diagrams showing a state of the coupler 28 after the motive power of the motor 46 on the left side has been stopped. In this instance, it is assumed that a turning control can be continued ($\theta r$ is variable) only for the rear wheel 16R, and the turning control cannot be continued ($\theta 1$ is fixed on the toe-out side) for the rear wheel 16L.

By turning the rear wheel 16R toward the toe-out side from the turning state shown in FIG. 6A, the differential angle $\Delta\theta$ increases. In this case, only the motive power of the turning actuator 36R is transmitted to the coupler 28 through the wire 26R. Stated otherwise, only the wire 26R is rotated in the direction of the arrow B1, and the first screw-engagement member 70 is screwed inwardly in the direction of the arrow A2.

In the example of FIGS. 7A and 7B, a turning state is shown in which $\theta r=0$ and $\theta 1=-\theta th$. When the first screw-engagement member 70 reaches the limit position P2 ($\Delta\theta=\theta th$), the first threaded portion 76 enmeshes with the tapered second threaded portion 84 without gaps at the terminal end 90. Consequently, the first screw-engagement member 70 and the second screw-engagement member 72 become fixed together mutually to such an extent that the fixture therebetween cannot easily be removed. Thereafter, the wires 26R, 26L become capable of being rotated integrally (i.e., in a mutually interlocked manner) via the fixed coupler 28.

Thereafter, upon turning the rear wheel 16R further toward the toe-out side, the motive power of the turning actuator 36R is transmitted to the speed-reducing mechanism 44 (see FIG. 2) of the turning actuator 36L through the wires 26R, 26L. Upon doing so, the rear wheel 16L is pressed out in conjunction with the rod member 50 (see FIG. 2) toward the side of the arrow X1 (toward the outer side in the vehicle widthwise direction), and is turned toward the toe-in side.

Figure 8A:
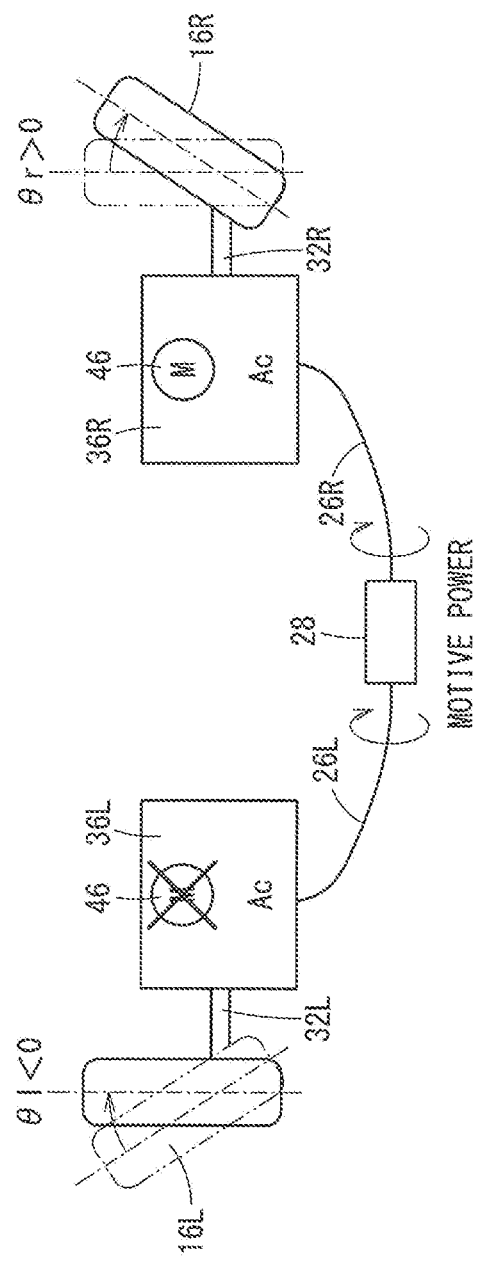
FIG. 8A and FIG. 8B are diagrams showing a state in which the coupler is operating after the motive power (torque) of the motor on the left side has been stopped.
Figure 8B:
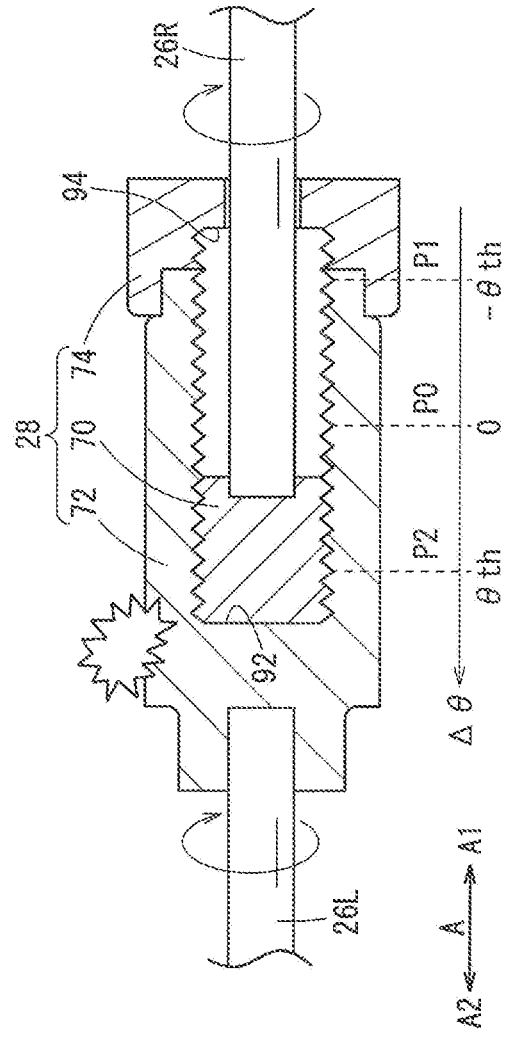

As shown in FIGS. 8A and 8B, while the turning state of $\Delta\theta=\theta th$ is maintained, the rear wheel 16L on the side where the turning actuator 36L has failed is turned. Thereafter, the ECU 22 may acquire a detection signal indicating the current turning state, and may adjust the toe angles of the rear wheels 16R, 16L to an angle at which yawing does not occur during straight traveling of the vehicle 10. For example, by adjusting the toe angles ($\theta r=-\theta 1$) to have the same absolute value, the stability of the traveling behavior of the vehicle 10 can be maintained.

Incidentally, contrary to the situation shown in FIGS. 7A to 8B, even in the case that the turning actuator 36R on the right side has suffered from a failure, the coupler 28 exhibits the same or similar functions as in the above-described case. In this instance, it is assumed that the turning control cannot be continued ($\theta r$ is fixed on the toe-out side) for the rear wheel 16R, and the turning control can be continued (θ1 is variable) only for the rear wheel 16L.

When the first screw-engagement member 70 reaches the limit position P1 (Δθ=−θth), the first threaded portion 76 enmeshes with the tapered third threaded portion 96 without gaps. Consequently, the first screw-engagement member 70 and the second screw-engagement member 72 become fixed together mutually to such an extent that the fixture therebetween cannot easily be removed. Thereafter, the wires 26R, 26L become capable of being mutually interlocked via the fixed coupler 28.

Thereafter, upon turning the rear wheel 16L further toward the toe-in side, the motive power of the turning actuator 36L is transmitted to the speed-reducing mechanism 44 (see FIG. 2) of the turning actuator 36R through the wires 26R, 26L. Upon doing so, the rear wheel 16R is pressed out in conjunction with the rod member 50 (see FIG. 2) toward the side of the arrow X1 (toward the outer side in the vehicle widthwise direction), and is turned toward the toe-in side.

Figure 9A:
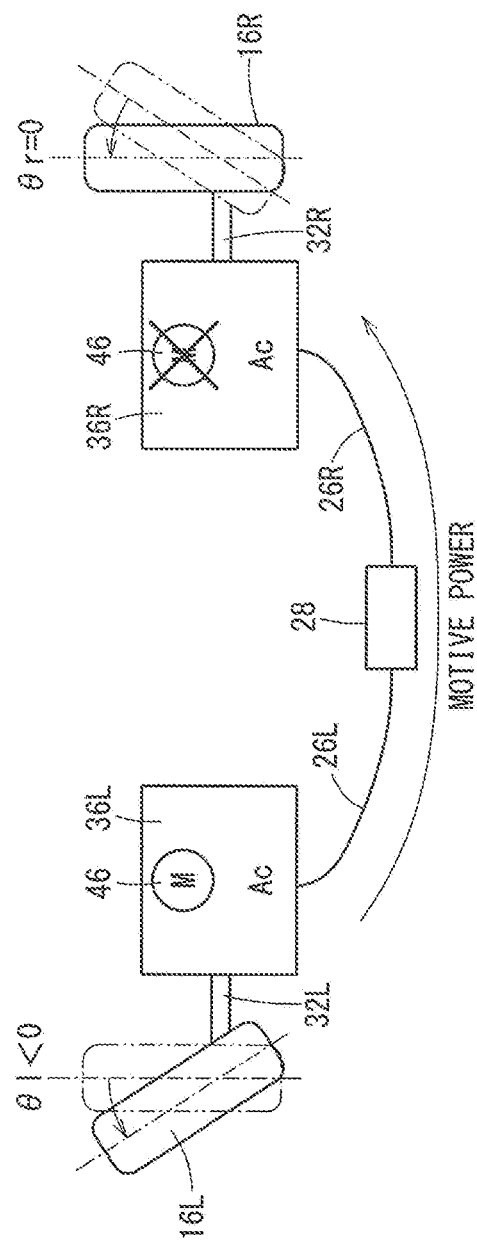
FIG. 9A and FIG. 9B are diagrams showing a state in which the coupler is operating after the motive power (torque) of the motor on the right side has been stopped.
Figure 9B:
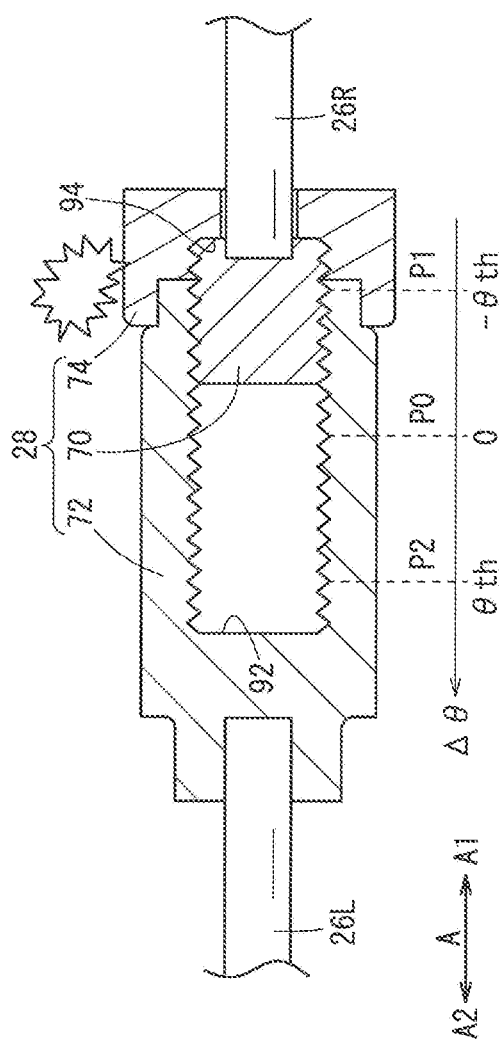

As shown in FIGS. 9A and 9B, while the turning state of Δθ=−θth is maintained, the rear wheel 16R on the side where the turning actuator 36R has failed is turned. Consequently, the stability of the traveling behavior of the vehicle 10 can be maintained.

<Operations and Effects of Turning Mechanism 20>

As described above, the turning mechanism 20 provided in the vehicle 10 is equipped with [1] the turning actuator 36R for adjusting the toe angle (θr) of the rear wheel 16R, [2] the wire 26R (first movable member) which moves in the direction (movable direction) of the arrow B under the motive power of the turning actuator 36R, [3] the turning actuator 36L for adjusting the toe angle (θ1) of the rear wheel 16L, [4] the wire 26L (second movable member) which moves in the direction of the arrow B under the motive power of the turning actuator 36L, and [5] the coupler 28 connecting the wires 26R, 26L.

The coupler 28 is configured in a manner so that [6] (6a) the wires 26R, 26L are capable of being moved independently in the case that the difference (differential angle Δθ) between the toe angles of the rear wheels 16R, 16L lies within an allowable range, whereas (6b) in the case that the differential angle Δθ has exceeded the allowable range, is configured in a manner so that the wires 26R, 26L are capable of being operated in a mutually interlocked manner.

In the foregoing manner, in the case that the differential angle Δθ lies within the allowable range, the coupler 28 is configured to be capable of independently moving the wires 26R, 26L, and therefore, at a time of normal traveling, a decrease in steering responsiveness is not caused due to the mechanical structure.

On the other hand, in the case that the differential angle Δθ has exceeded the allowable range, the coupler 28 is configured so as to be capable of operating the wires 26R, 26L in a mutually interlocked manner, whereby even in the case that the motive power from one of the turning actuators 36L is stopped, the motive power from the other of the turning actuators 36R is capable of being transmitted. Thereafter, the toe angles of the two rear wheels 16R, 16L are synchronously adjusted by the other of the turning actuators 36R, and therefore, it is possible to avoid a situation in which the differential angle Δθ further increases.

Consequently, without lowering steering responsiveness during normal traveling, it is possible to maintain the stability of the traveling behavior of the vehicle 10 even in a situation in which one of the turning actuators 36L has failed. As a result, the traveling performance is improved in accordance with a toe-in control, which utilizes the advantage of the turning mechanism 20 that is capable of turning the right and left vehicle wheels (rear wheels 16R, 16L) independently.

Further, each of the turning actuators 36R, 36L may be an actuator that converts rotational motion of the motor 46 into linear motion, and the first movable member and the second movable member may respectively be wires 26R, 26L that are rotated in a circumferential direction by rotational power from the motor 46. By transmitting rotational power through the two wires 26R, 26L, the mutual influence of one on the other when a turning control is performed is reduced, in comparison with a configuration in which linear power is directly transmitted to the rear wheels 16R, 16L.

For example, in the case of connecting the rear suspensions 24R, 24L (see FIG. 1) using a conventional linkage mechanism, if the stroke amount of the suspensions increases, interference between the toe angles or the camber angles tends to easily occur. In contrast thereto, by transmitting the rotational power through the two wires 26R, 26L, it becomes unlikely for the aforementioned interference to occur.

Further, the coupler 28 may comprise the first screw-engagement member 70 attached to the distal end portion of the wire 26R, and having the first threaded portion 76, and the second screw-engagement member 72 attached to the distal end portion of the wire 26L, and having the second threaded portion 84 capable of being screw-engaged with the first threaded portion 76, wherein the first screw-engagement member 70 and the second screw-engagement member 72 may be fixed to each other in the case that the differential angle Δθ has exceeded the allowable range. In accordance with these features, while providing a simplified device configuration, the function of synchronously adjusting the toe angles of the two rear wheels 16R, 16L can be realized.

<Modifications>

Figure 10A:
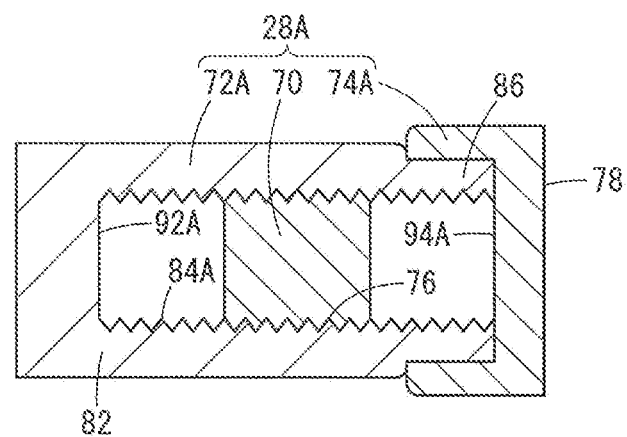
FIGS. 10A to 10C are longitudinal cross-sectional views of couplers according to modified examples of the first embodiment.
Figure 10B:
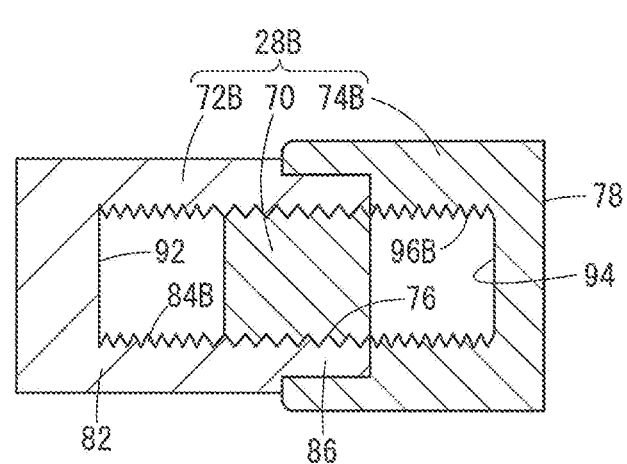
Figure 10C:
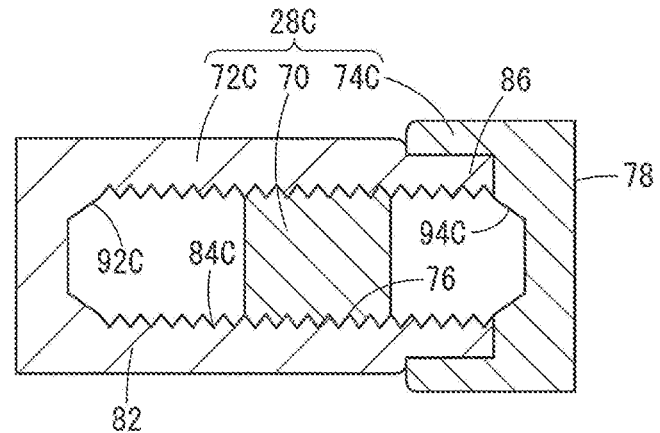

Incidentally, the coupling structure for coupling the wires 26R, 26L is not limited to the structural example shown in FIGS. 3 to 4B. Below, modifications of the coupler 28 (couplers 28A to 28C) will be described with reference to FIGS. 10A to 10C. In FIGS. 10A to 10C, reference characters for the wires 26R, 26L have been omitted.

The coupler 28A shown in FIG. 10A is constituted from the first screw-engagement member 70, and a second screw-engagement member 72A and a lid member 74A which differ in shape from those of the first embodiment. The second screw-engagement member 72A includes a tubular portion 82, a second threaded portion 84A on an inner circumferential surface of the tubular portion 82 that can be screwed-engaged with the first threaded portion 76, and a stepped portion 86 provided on the side of an opening of the tubular portion 82. The lid member 74A differs in configuration from the lid member 74, in that the third threaded portion 96 (see FIG. 4A) is not provided thereon.

The second threaded portion 84A is formed in a tubular shape having the same diameter along the axial direction of the tubular portion 82. An inner bottom surface 92A of the tubular portion 82 is configured to be capable of fixing the distal end side of the first screw-engagement member 70 via a non-illustrated fixing mechanism (for example, a claw member). An inner bottom surface 94A of the lid member 74A is configured to be capable of fixing the distal end side of the first screw-engagement member 70 via a non-illustrated fixing mechanism (for example, a claw member).

In this case, when the differential angle Δθ exceeds the allowable range, the first screw-engagement member 70 abuts against the inner bottom surface 92A (or the inner bottom surface 94A), whereupon the first screw-engagement member 70 becomes fixed with respect to the second screw-engagement member 72A (or the lid member 74A). With such a configuration as well, it is possible for the wires 26R, 26L to be coupled through the coupler 28A.

The coupler 28B shown in FIG. 10B is constituted from the first screw-engagement member 70, and a second screw-engagement member 72B and a lid member 74B which differ in shape from those of the first embodiment. The second screw-engagement member 72B includes a tubular portion 82, a second threaded portion 84B on an inner circumferential surface of the tubular portion 82 that can be screwed-engaged with the first threaded portion 76, and a stepped portion 86 provided on the side of an opening of the tubular portion 82.

The second threaded portion 84B is formed in a tubular shape having the same diameter along the axial direction of the tubular portion 82. One part of the second threaded portion 84B is provided in a manner so that the pitch thereof gradually decreases toward the inner bottom surface 92 of the tubular portion 82.

Further, at a position surrounding an inner bottom surface 94 of the lid surface part 78, the lid member 74B includes a third threaded portion 96B that can be screwed-engaged with the first threaded portion 76. The third threaded portion 96B is formed in a tubular shape having the same diameter along a normal direction of the inner bottom surface 94. The third threaded portion 96B is provided in a manner so that the pitch thereof gradually decreases toward the inner bottom surface 94.

In this case, when the differential angle $\Delta\theta$ exceeds the allowable range, the first threaded portion 76 becomes enmeshed with the second threaded portion 84B (or the third threaded portion 96B) without gaps, and the first screw-engagement member 70 becomes fixed with respect to the second screw-engagement member 72B (or the lid member 74B). With such a configuration as well, it is possible for the wires 26R, 26L to be coupled through the coupler 28B.

The coupler 28C shown in FIG. 10C is constituted from the first screw-engagement member 70, and a second screw-engagement member 72C and a lid member 74C which differ in shape from those of the first embodiment. The second screw-engagement member 72C includes a tubular portion 82, a second threaded portion 84C that can be screw-engaged with the first threaded portion 76 on an inner circumferential surface of the tubular portion 82, and a stepped portion 86 provided on the side of an opening of the tubular portion 82. The lid member 74C differs in configuration from the lid member 74, in that the third threaded portion 96 (see FIG. 4A) is not provided thereon.

The second threaded portion 84C is formed in a tubular shape having the same diameter along the axial direction of the tubular portion 82. An inner bottom surface 92C of the tubular portion 82 is formed in a tapered shape which gradually decreases in diameter toward the bottom side. Similarly, an inner bottom surface 94C of the lid member 74C is formed in a tapered shape which gradually decreases in diameter toward the bottom side.

In this case, when the differential angle $\Delta\theta$ exceeds the allowable range, the first screw-engagement member 70 abuts against the inner bottom surface 92C (or the inner bottom surface 94C), and for example, by the occurrence of plastic deformation, the first screw-engagement member 70 becomes fixed with respect to the second screw-engagement member 72C (or the lid member 74C). With such a configuration as well, it is possible for the wires 26R, 26L to be coupled through the coupler 28C.

Second Embodiment

Initially, a vehicle 110 and a turning mechanism 120 according to a second embodiment will be described with reference to FIGS. 11 to 13B. The same reference numerals have been used to denote the same or similar structural elements as those of the first embodiment (the vehicle 10 and the turning mechanism 20), and descriptions of such structural elements may be omitted in certain cases.

<Principal Components of Vehicle 110>

Figure 11:
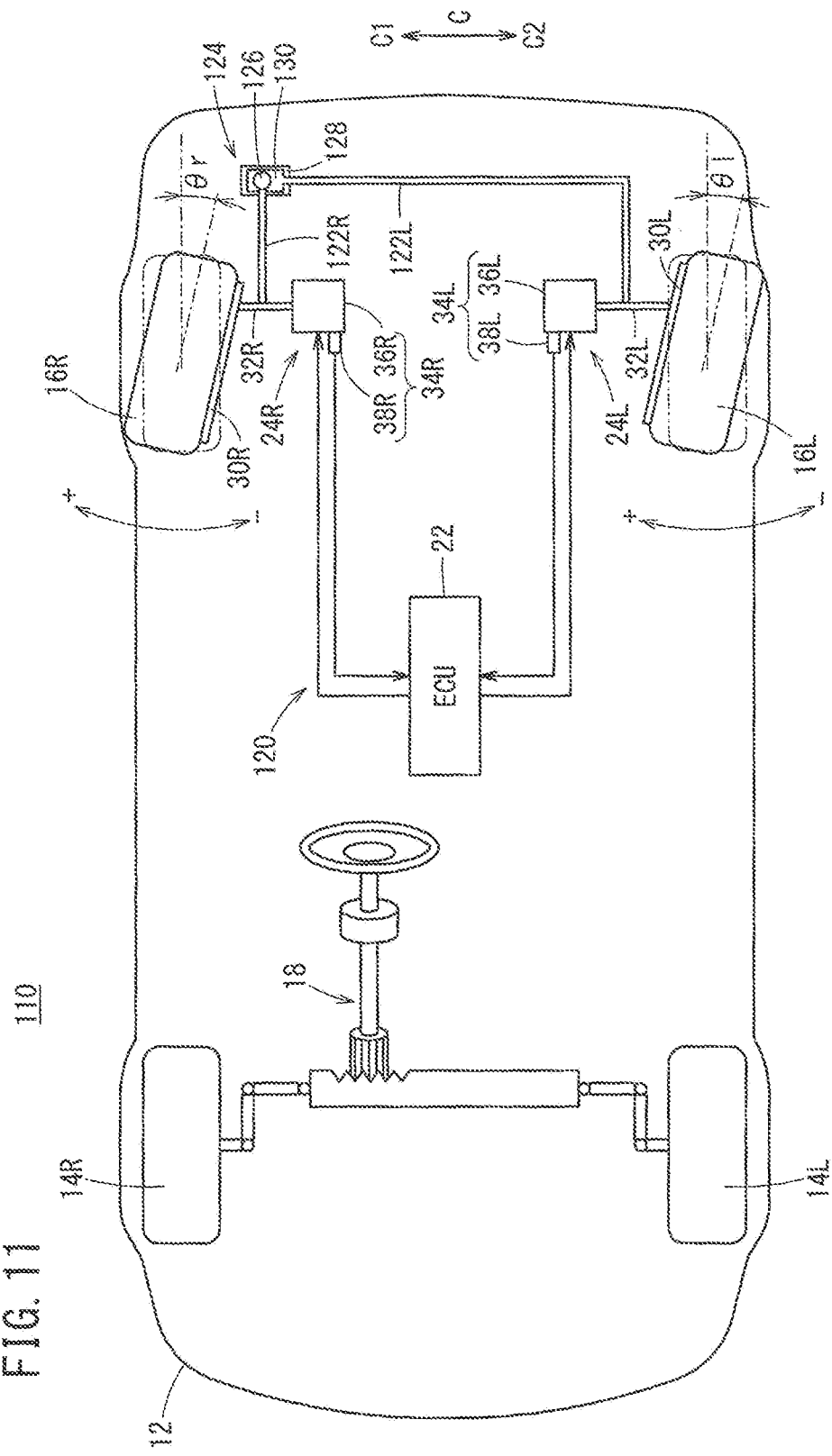
FIG. 11 is a diagram showing principal components of a vehicle in which a turning mechanism according to a second embodiment is incorporated.

FIG. 11 is a diagram showing principal components of the vehicle 110 in which the turning mechanism 120 according to the second embodiment is incorporated. Similar to the vehicle 10 (FIG. 1) according to the first embodiment, the vehicle 110 is a four-wheeled vehicle having a four-wheel steering mechanism. In the descriptions given below, the subscripts "R" and "L" may be omitted in the event there is no need to distinguish between right and left.

The vehicle 110 is constituted to include, apart from the vehicle body 12, the front wheels 14R, 14L, the rear wheels 16R, 16L, the steering mechanism 18, and the ECU 22, a turning mechanism 120 in which the device configuration thereof differs from that of the first embodiment (turning mechanism 20).

The turning mechanism 120 is equipped with a rear suspension 24R on which a rear wheel 16R (first vehicle wheel) is suspended on the vehicle body 12, an I-shaped bar 122R (first movable member) connected to the rear suspension 24R, a rear suspension 24L on which a rear wheel 16L (second vehicle wheel) is suspended on the vehicle body 12, an L-shaped bar 122L (second movable member) connected to the rear suspension 24L, and a coupler 124 connecting the two bars 122R, 122L.

The coupler 124 is constituted by a substantially spherical first engagement member 126 provided at a distal end portion of the bar 122R, and a second engagement member 128 provided at a distal end portion of the bar 122L. In the second engagement member 128, a slot hole 130 is formed, which extends in the vehicle widthwise direction, and is capable of engagement with the first engagement member 126. Hereinafter, the longitudinal direction of the slot hole 130 (the displacement direction of the first engagement member 126) is indicated by the arrow C. Further, a side in proximity to the rear wheel 16R will be referred to as an arrow C1 side, and a side in proximity to the rear wheel 16L will be referred to as an arrow C2 side.

<Turning Actuator 36R (36L)>

The turning actuator 36R (36L) shown in FIG. 11 differs in that the wire 26R (26L) is not connected to the other end part 62 of the speed-reducing mechanism 44, but in other aspects thereof, is basically the same as the configuration shown in FIG. 2.

<Operations of Coupler 124 (when Operating Normally)>

Figure 12A:
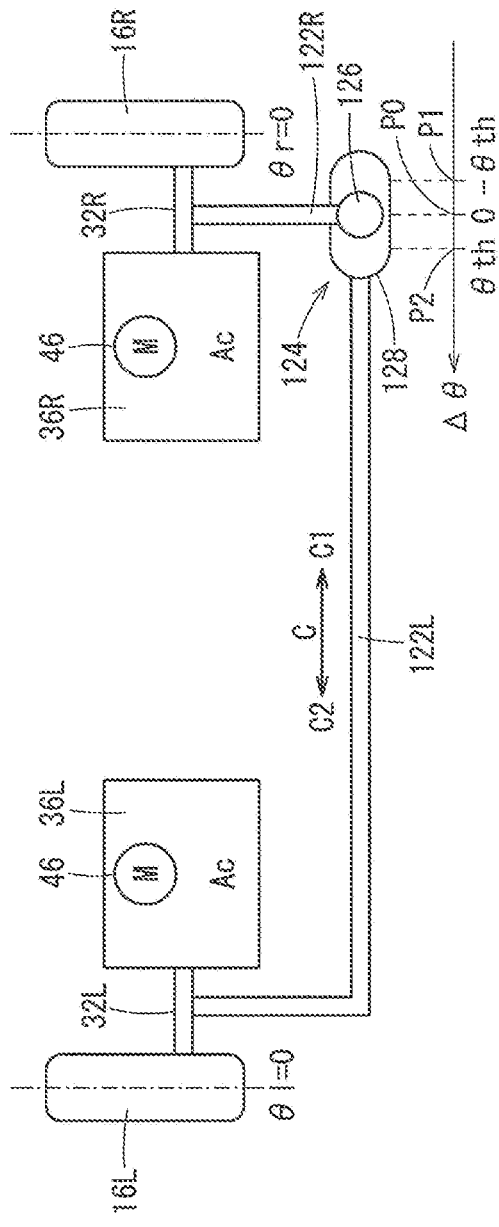
FIG. 12A and FIG. 12B are diagrams showing the state of the coupler at a time of a normal turning operation when both of the left and right motors are operated.
Figure 12B:
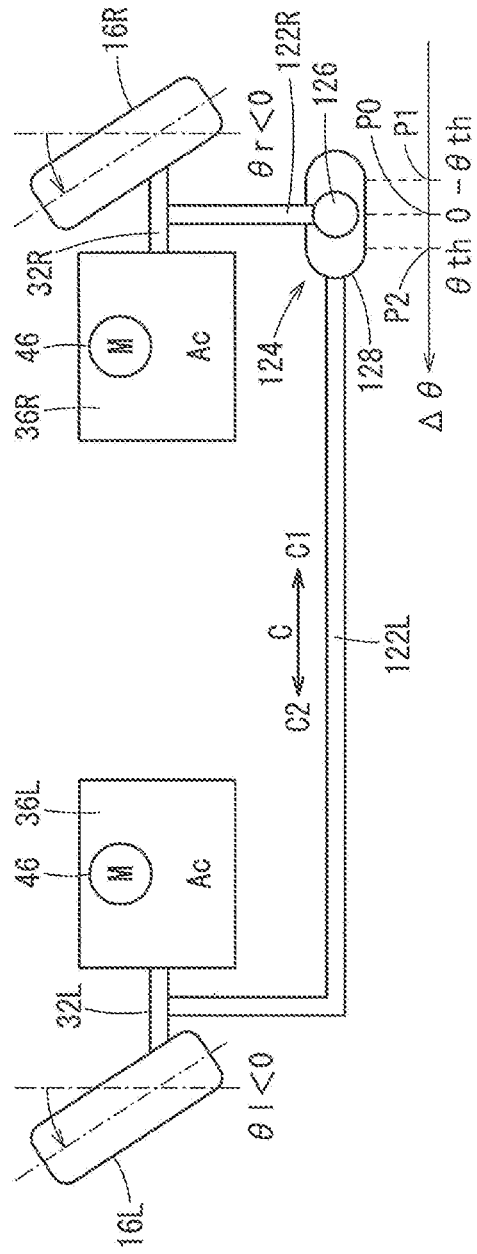

FIGS. 12A and 12B are views showing the state of the coupler 124 in a case where the motive power of both the left and right motors 46 is transmitted, and more specifically, is a diagram schematically showing a turning state by the turning mechanism 120 shown in FIG. 11.

In the example of FIG. 12A, a turning state is shown satisfying the relationship of $\theta r=\theta l=0$. In this case, since a condition in which the differential angle $\Delta\theta=0$ is satisfied, the first engagement member 126 remains at the initial position P0.

In the example of FIG. 12B, a turning state is shown satisfying the relationship of $\theta r=\theta l<0$. For example, in the case that the toe angles of the rear wheels 16R, 16L are synchronously controlled, the motive powers of the turning actuators 36R, 36L are transmitted to the coupler 124 respectively via the bars 122R, 122L.

During execution of such a synchronous control, the condition in which the differential angle Δθ=0 is always satisfied, irrespective of the magnitude of the toe angle. In this case, since the bars 122R, 122L are displaced synchronously in the direction of the arrow C, and the first engagement member 126 and the second engagement member 128 do not move relative to each other, the first engagement member 126 remains stationary at the initial position P0.

In the case that the turning actuators 36R, 36L (both the left and right motors 46) are operating normally, the ECU 22 performs the turning control so as to satisfy the relationship of |Δθ|<θth. Stated otherwise, in the case that the first engagement member 126 lies between a limit position P1 (Δθ=−θth) and a limit position P2 (Δθ=θth), the bars 122R and 122L can be moved independently. According to the present example shown in the figure, the initial position P0 is the midpoint between the limit positions P1 and P2, however, the positional relationship is not limited to this feature.

With the coupler 124 in this state, the linear power by the one bar 122R does not impart any influence to the other turning actuator 36L, and the linear power by the other bar 122L does not impart any influence to the one turning actuator 36R. Consequently, when the vehicle 10 is traveling normally, a decrease in steering responsiveness is not caused due to the mechanical structure.

<Operations of Coupler 124 (During Failure)>

Incidentally, a state is assumed in which the turning actuator 36L on the left side has suffered from a failure for some reason, and the motive power of the motor 46 has been stopped. Next, operations of the coupler 124 under such a condition will be described while referring to FIGS. 13A and 13B.

It is assumed that a turning control can be continued (θr is variable) only for the rear wheel 16R, and the turning control cannot be continued (θ1 is fixed on the toe-out side) for the rear wheel 16L. By turning the rear wheel 16R toward the toe-out side from the turning state shown in FIG. 12B, the differential angle Δθ increases. In this case, only the motive power of the turning actuator 36R is transmitted to the coupler 124 through the bar 122R. Stated otherwise, only the bar 122R is displaced in the direction of the arrow C2, and the first engagement member 126 slides toward the side of the arrow C2.

FIG. 13A is a diagram showing a state of the coupler 124 after the motive power of the motor 46 on the left side has been stopped. According to the present example shown in the figure, a turning state is shown in which θr=0 and θ1=−θth. When the limit position P2 (Δθ=θth) is reached, the first engagement member 126 abuts against the second engagement member 128. Consequently, the first engagement member 126 and the second engagement member 128 become fixed to each other in the direction of the arrow C2. Thereafter, the bars 122R, 122L become capable of being displaced integrally (i.e., in a mutually interlocked manner) via the fixed coupler 124.

Thereafter, upon turning the rear wheel 16R further toward the toe-out side, the motive power of the turning actuator 36R is transmitted to the arm portion 32L through the bars 122R, 122L. Upon doing so, the rear wheel 16L is pressed out in conjunction with the rod member 50 (see FIG. 2) toward the side of the arrow C2 (toward the outer side in the vehicle widthwise direction), and is turned toward the toe-in side.

As shown in FIG. 13B, while the turning state of Δθ=θth is maintained, the rear wheel 16L on the side where the turning actuator 36L has failed is turned. Consequently, the stability of the traveling behavior of the vehicle 110 can be maintained. Moreover, even in the case that the turning actuator 36R on the right side has suffered from a failure, the coupler 124 exhibits the same or similar functions as in the above-described case.

On the other hand, by turning the rear wheel 16R toward the toe-in side, the first engagement member 126 is displaced in the direction of the arrow C1, whereby the fixed state of the first engagement member 126 and the second engagement member 128 is released. Upon doing so, the bars 122R, 122L are again capable of being displaced independently.

<Operations and Effects of Turning Mechanism 120>

As described above, the turning mechanism 120 provided in the vehicle 110 is equipped with [1] the turning actuator 36R for adjusting the toe angle (θr) of the rear wheel 16R, [2] the bar 122R (first movable member) which moves in the direction (movable direction) of the arrow C under the motive power of the turning actuator 36R, [3] the turning actuator 36L for adjusting the toe angle (θ1) of the rear wheel 16L, [4] the bar 122L (second movable member) which moves in the direction of the arrow C under the motive power of the turning actuator 36L, and [5] the coupler 124 connecting the bars 122R, 122L.

The coupler 124 is configured in a manner so that [6] (6a) the bars 122R, 122L are capable of being moved independently in the case that the difference (differential angle Δθ) between the toe angles of the rear wheels 16R, 16L lies within an allowable range, whereas (6b) in the case that the differential angle Δθ has exceeded the allowable range, is configured in a manner so that the bars 122R, 122L are capable of being operated in a mutually interlocked manner.

In this manner, even with a configuration in which the bars 122R, 122L are moved in position by the linear motive power of the turning actuators 36R, 36L instead of the rotational power of the motor 46, the same advantageous effects as those in the first embodiment (coupler 28) can be obtained. More specifically, without lowering steering responsiveness during normal traveling, it is possible to maintain the stability of the traveling behavior of the vehicle 110 even in a situation in which one of the turning actuators 36L has failed.

[Supplemental Considerations]

The present invention is not limited to the embodiments described above, and it goes without saying that the present invention can be freely modified within a range that does not depart from the essence and gist of the present invention. Alternatively, the respective configurations may be combined arbitrarily within a range in which no technical inconsistencies occur.

What is claimed is:

1. A turning mechanism comprising:
    a first turning actuator adapted to adjust a toe angle of a first vehicle wheel;
    a first movable member adapted to move in a movable direction under a motive power of the first turning actuator;
    a second turning actuator adapted to adjust a toe angle of a second vehicle wheel;
    a second movable member adapted to move in a movable direction under a motive power of the second turning actuator; and
    a coupler connecting the first movable member and the second movable member;

wherein the coupler:
is configured in a manner so that the first movable member and the second movable member are capable of being moved independently in the case that a difference between the toe angles of the first vehicle wheel and the second vehicle wheel lies within an allowable range;
whereas, in the case that the difference between the toe angles has exceeded the allowable range, is configured in a manner so that the first movable member and the second movable member are capable of being operated in a mutually interlocked manner,
wherein each of the first turning actuator and the second turning actuator is an actuator adapted to convert rotational motion of a motor into linear motion; and
each of the first movable member and the second movable member is a wire adapted to be rotated in a circumferential direction by rotational power from the motor.

2. A turning mechanism comprising:
a first turning actuator adapted to adjust a toe angle of a first vehicle wheel;
a first movable member adapted to move in a movable direction under a motive power of the first turning actuator;
a second turning actuator adapted to adjust a toe angle of a second vehicle wheel;
a second movable member adapted to move in a movable direction under a motive power of the second turning actuator; and
a coupler connecting the first movable member and the second movable member;
wherein the coupler:
is configured in a manner so that the first movable member and the second movable member are capable of being moved independently in the case that a difference between the toe angles of the first vehicle wheel and the second vehicle wheel lies within an allowable range;
whereas, in the case that the difference between the toe angles has exceeded the allowable range, is configured in a manner so that the first movable member and the second movable member are configured to be operated in a mutually interlocked manner,
wherein the coupler comprises:
a first screw-engagement member attached to a distal end portion of the first movable member, and having a first threaded portion; and
a second screw-engagement member attached to a distal end portion of the second movable member, and having a second threaded portion configured to be screw-engaged with the first threaded portion;
wherein the first screw-engagement member and the second screw-engagement member are fixed to each other in the case that the difference between the toe angles has exceeded the allowable range.

3. A vehicle comprising a turning mechanism comprising:
a first turning actuator adapted to adjust a toe angle of a first vehicle wheel;
a first movable member adapted to move in a movable direction under a motive power of the first turning actuator;
a second turning actuator adapted to adjust a toe angle of a second vehicle wheel;
a second movable member adapted to move in a movable direction under a motive power of the second turning actuator; and
a coupler connecting the first movable member and the second movable member;
wherein the coupler:
is configured in a manner so that the first movable member and the second movable member are configured to be moved independently in the case that a difference between the toe angles of the first vehicle wheel and the second vehicle wheel lies within an allowable range; whereas, in the case that the difference between the toe angles has exceeded the allowable range, is configured in a manner so that the first movable member and the second movable member are configured to be operated in a mutually interlocked manner,
wherein each of the first turning actuator and the second turning actuator is an actuator adapted to convert rotational motion of a motor into linear motion; and
each of the first movable member and the second movable member is a wire adapted to be rotated in a circumferential direction by rotational power from the motor.

* * * * *